US008616445B2

(12) United States Patent
Eschbach et al.

(10) Patent No.: US 8,616,445 B2
(45) Date of Patent: Dec. 31, 2013

(54) METHOD AND SYSTEM FOR END USER VERIFICATION OF CONTROLLED SUBSTANCES

(75) Inventors: Reiner Eschbach, Webster, NY (US); Michael Jacob Albin, Laveen, AZ (US); Craig Dixon Galler, Scottsdale, AZ (US)

(73) Assignee: Xerox Corporation, Norwalk, CT (US)

( * ) Notice: Subject to any disclaimer, the term of this patent is extended or adjusted under 35 U.S.C. 154(b) by 37 days.

(21) Appl. No.: 13/438,175

(22) Filed: Apr. 3, 2012

(65) Prior Publication Data

US 2013/0256400 A1 Oct. 3, 2013

(51) Int. Cl.
*G06K 5/00* (2006.01)

(52) U.S. Cl.
USPC .......... 235/380

(58) Field of Classification Search
USPC .......... 235/380; 705/31
See application file for complete search history.

(56) References Cited

U.S. PATENT DOCUMENTS 6,360,208 B1 * 3/2002 Ohanian et al. .......... 705/31
2013/0037608 A1 * 2/2013 Evevsky .......... 235/380

OTHER PUBLICATIONS

Unique Tax Stamp, product discription, Allami Nyomda State Printing Company, printed from website, www.allaminyomda.com Apr. 3, 2012.
"Analysis of the available technology for unique markings in view of the global track-and-trace regime proposed in the negotiating text for a protocol to eliminate illicit trade in tobacco products", Who Framework Convention on Tobacco Control, Fourth Session, Geneava, Switzerland, Mar. 14-21, 2010.

* cited by examiner

*Primary Examiner* — Christle Marshall
(74) *Attorney, Agent, or Firm* — Fox Rothschild LLP

(57) ABSTRACT

A portable electronic device includes an image capture module that captures a digital image of a symbology that is affixed to a regulated product. The device decodes the symbology to identify an end user functional element which has a public component and a law enforcement component. If the device has received a law enforcement official verification, then the device may use the law enforcement component of the functional element to take a first action. If the device has not received the law enforcement official verification, then the processor device may use the public component of the functional element to take a second action.

12 Claims, 8 Drawing Sheets

METHOD AND SYSTEM FOR END USER VERIFICATION OF CONTROLLED SUBSTANCES

BACKGROUND

Many federal, state and local governments regulate the sale of certain products to consumers. Such regulations commonly affect controlled substances, such as cigarettes and alcohol. For example, in the United States, certain states restrict sales of cigarettes to adults over the age of 18 or 19. Other countries have age restrictions on cigarette sales that range from age 14 to age 21. Other products, such as firearms and fireworks, also may be subject to regulatory sales restrictions. In jurisdictions with such regulations, law enforcement authorities seek improved ways to track compliance with the regulatory sales restrictions for controlled substances and other regulated products.

In addition, many governments impose sales taxes on specific regulated products, such as cigarettes, alcohol and motor fuel. In such cases, the taxing authority often seeks better ways to track sales and ensure proper collection of taxes.

In addition, for many regulated products a public and social issue exists as it pertains to the proper use of the products, including but not limited to the avoidance of abuse, including but not limited to underage use, as well as public service and health issues.

This document describes systems and methods that provide solutions to some or all of the problems described above, and that may provide additional benefits.

SUMMARY

In an embodiment, an image capture module of a portable electronic device captures a digital image of a symbology that is affixed to a regulated product. The device's processor decodes the symbology to identify an end user functional element which has a public component and a law enforcement component. The processor may determine whether the device has received a law enforcement official verification. If the device has received the law enforcement official verification, then the device may use the law enforcement component of the functional element to take a first action. If the device has not received the law enforcement official verification, then the processor device may use the public component of the functional element to take a second action.

The first action may include: (i) sending a request to an address of a law enforcement server via a communications network; (ii) receiving data corresponding to a law enforcement landing page from the law enforcement server via the communications network; and (iii) displaying the law enforcement landing page on a display of the electronic device. The method also may include receiving a security code via the law enforcement landing page, sending the security code to the law enforcement server via the communication network, receiving an indication from the law enforcement server of whether the security code corresponds to a valid revenue stamp for the regulated product, and displaying the indication on the device's display. Based on the security code, the law enforcement server may determine a point of purchase for the regulated product, receive an identification of the point of purchase, and display the identification of the point of purchase on the display of the portable electronic device.

In some embodiments, the method may include displaying a data entry field on the law enforcement landing page, in the data entry field receiving personally identifying information corresponding to a user of the regulated product, and sending the personally identifying information to the law enforcement server via the communication network.

In some embodiments, determining whether the device has received a law enforcement official verification may include receiving an authentication code and determining whether the authentication code corresponds to a reference code of a law enforcement official.

In some embodiments, the second action may include sending a request to an address of an end user server via a communications network, receiving data corresponding to an end user landing page from the end user server, and displaying the end user landing page on a display of the portable electronic device.

DETAILED DESCRIPTION

Figure 1:
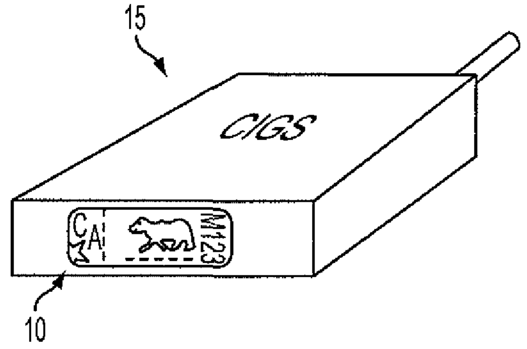
FIG. 1 PRIOR ART
FIG. 1 is an example of a regulated product on which a revenue stamp is affixed in accordance with the prior art.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In this document, the term "data" refers to physical signals that indicate or include information. An "image," as a pattern of physical light or a collection of data representing the physical light, may include characters, words, barcodes and text as well as other features such as graphics. A "digital image" is by extension an image represented by a collection of digital data.

As used in this document, a "law enforcement official" may include a government agent who is authorized to enforce laws, such as a police officer or judicial system employee. A law enforcement official also may include an employee, contractor or other authorized user of the government agency that regulates the controlled substance or other regulated product.

A "portable electronic device" refers to a device that includes an imaging device, a processor and tangible, computer-readable memory. The memory may contain programming instructions in the form of a software application that, when executed by the processor, causes the device to perform one or more barcode (or other symbology) scanning operations according to the programming instructions. Examples of suitable devices include portable electronic devices such as smartphones, personal digital assistants, cameras, tablet devices, electronic readers, personal computers, media players, satellite navigation devices and the like.

For the purposes of this document, a "symbology" is a pattern or symbol that that is displayed on a surface and which represents data. Symbologies may include, without limitation, one-dimensional barcodes, two-dimensional (2D) barcodes, or three-dimensional barcodes, and they may be an optical, machine-readable representation of data. Examples of one-dimensional barcodes include Universal Product Code (UPC) symbols and the like. Examples of two-dimensional barcodes include data matrix codes, quick response codes, Aztec codes, Maxi codes and the like. The symbology may be printed on a substrate or displayed on an electronic display, and may be of any geometric shape or size. In this document, the term "barcode" may be used in the examples, but the term is intended to include any such symbology.

As noted above, many governments impose sales taxes on regulated products such as cigarettes, alcohol, certain drugs or medicines, motor fuel, legal documents, hunting licenses, firearms and the like. Under such regulatory systems, the taxing authority may implement the tax through the sale of revenue stamps, also known as tax stamps. A revenue stamp is a label that may be affixed on, or integral with, a product that will be sold. The manufacturer, distributor or retailer purchases a revenue stamp from the taxing authority and affixes the stamp to the product. The appearance of the revenue stamp on the product indicates that someone in the supply chain has paid the required tax, duty or fee. An example of a revenue stamp 10 that appears on a package of cigarettes 15 is illustrated in FIG. 1.

Some taxing authorities have added security features to revenue stamps. For example, a revenue stamp may include an alphanumeric code that law enforcement authorities can use to verify the validity of the revenue stamp. Others, such as The Framework Convention Alliance, have proposed to replace the alphanumeric code with a barcode to allow law enforcement officers to verify stamp validity with a scanner. Unfortunately, the desire to add security features has been limited by the space available to affix a revenue stamp on the product. For example, most revenue stamps for cigarette packages have a boundary size of 12 mm×12 mm. The state of California has required that its cigarette stamps be expanded to a size of about 23 mm×12 min. However, it is often difficult to make revenue stamps larger due to the package size, and it is difficult to add more information to the revenue stamps due to the information that is already required.

Figure 2:
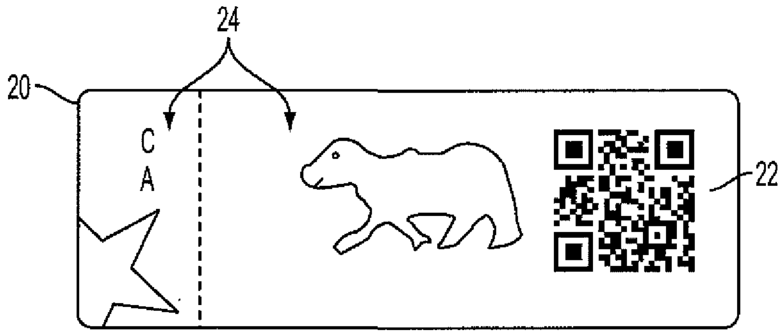
FIG. 2 illustrates an example of a revenue stamp that may be used with the embodiments described in this document.

In the embodiments described in this document, as shown in the example of FIG. 2, a label 20 includes revenue stamp information 24, in particular text or symbols that are required by a regulatory agency to indicate that a tax or tariff has been paid for the product on which the label is affixed. The label 20 also includes two-level symbology 22 allowing for both law enforcement and public usage, implemented as a computer readable symbology, such as a quick response code or other barcode. 2D barcodes and other symbologies are effective for sharing small amounts of data and may be used for tracking objects that are marked with the barcode. The symbology 22 in this embodiment includes at least two informational elements: an end-user element and a law enforcement element, which in some embodiments may be encrypted, encoded, or otherwise obscured so that its meaning is not obvious to the public. The end user element represents data that corresponds to an address where a user or purchaser of a regulated product may obtain information about the product and/or the use of the product. The law enforcement element represents data that corresponds to an address where a governmental official, such as a law enforcement officer or an agent of a regulatory authority, may obtain tracking information about the item to which the label is attached. Each of these elements will be described in more detail below.

Figure 3:
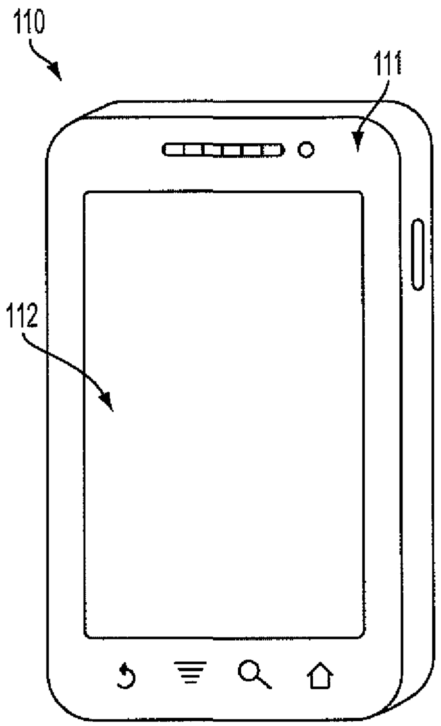
FIG. 3 is a front view of an example of an electronic device that may be used to read a symbology such a 2D barcode.

FIG. 3 shows one example of an electronic device 110 that may be used to capture information from a symbology such as that described above. The electronic device 110 may include a front face 111 and a display 112. The display 112 may be any suitable component for displaying images, including, but not limited to, an electroluminescent display, an electronic paper display, a vacuum fluorescent display, a light emitting diode (LED) display, a cathode ray tube (CRT) display, a liquid crystal (LCD) display, a plasma display panel, a digital light processing (DLP) display, and an organic light-emitting diode (OLED) display. The display 112 may also include a touch sensitive screen, including, but not limited to, resistive touchscreens, capacitive touchscreens, and infrared touchscreens.

Figure 4:
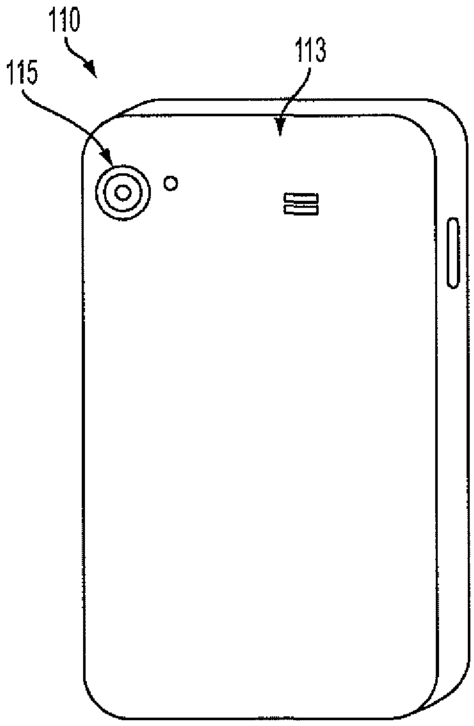
FIG. 4 is a rear view of an electronic device of FIG. 3.

FIG. 4 shows a rear face 113 of the electronic device 110. The rear face 113 may include an imaging device 115. The imaging device 115 may be any suitable component capable of receiving an optical image and converting an interpretation of that object into electronic signals. One such example of an imaging device is a camera. The device also may include an image capture module, i.e., a software application and/or image sensing hardware that is used to capture images.

While the imaging device 15 is depicted on the rear face of the present example, persons skilled in the art will appreciate that the imaging device 15 may be positioned at any location upon any face of the electronic device 10, or may even be external to the electronic device 10 and connected by any means of electronic communication, including, but not limited to, physical cable communication such as universal serial bus (USB), wireless radio communication, wireless light communication, or near field communication technology.

In some embodiments, the display 12 may be positioned within the electronic device 10, and may be configured in such a way so as to display the output of the imaging device 15 in real time so that the user may view the display 12 and see the output of the imaging device 15 on the display.

Accordingly, the configuration of the electronic device 10 as shown in FIGS. 3 and 4 is only an example, and persons skilled in the art will appreciate other configurations that are able to achieve a similar overall result.

Figure 5:
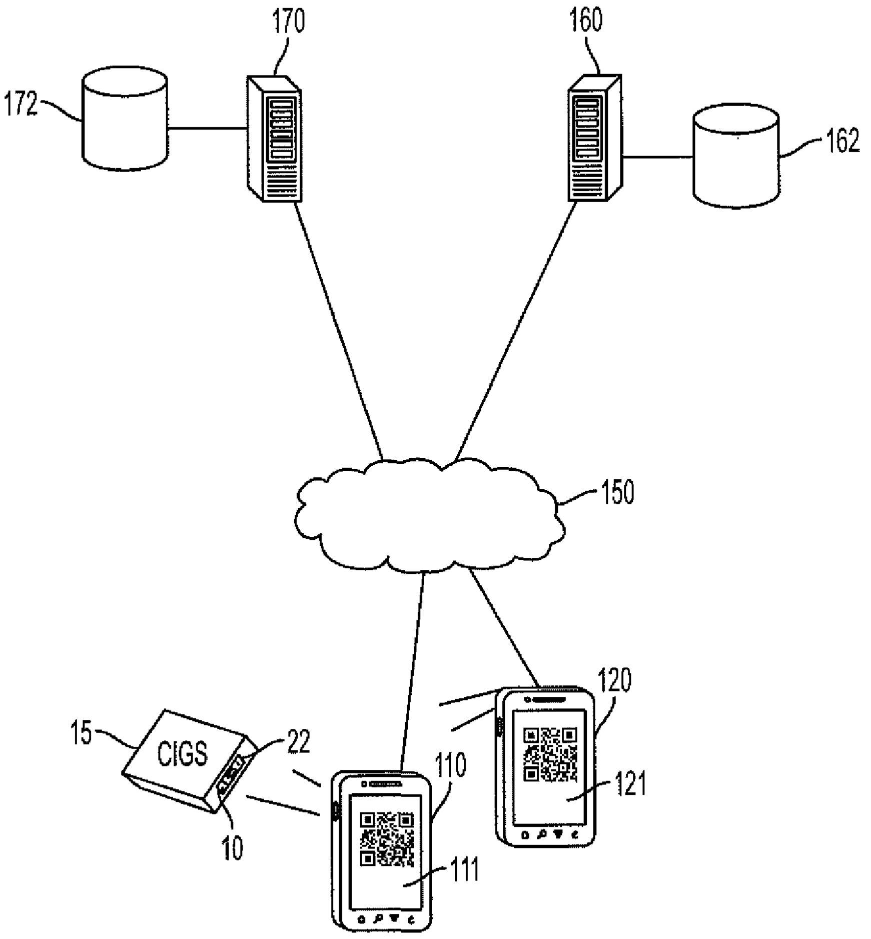
FIG. 5 illustrates how an electronic device may read a 2D barcode.

FIG. 5 illustrates several elements of an embodiment of a controlled substance verification system. A regulated product 15, in this example a package of cigarettes whose sale is regulated by a government agency, includes a revenue stamp 10 affixed on its package. The revenue stamp includes a symbology 22, in this case a two-dimensional barcode, containing information that may be used by law enforcement officials, as well as information that may be used by an end user. An end user, such as a purchaser of the substance, may use a portable electronic device 110 to capture an image of the barcode. The electronic device may include a processor, an image capture module such as a camera, and a non-transitory storage medium containing programming instructions that correspond to any now or hereafter known barcode reading software application. When the device captures a digital image of the barcode, the device may implement programming instructions that cause an image of the barcode to be outputted on a display 111. The barcode reading application will also implement instructions to decode the barcode. A law enforcement official also may use a portable electronic device 120 to capture an image of the barcode 22, decode the barcode, and optionally display the barcode or the decoded barcode information on a display 121.

When the symbology is a QR code such as that shown in FIG. 5, the QR code may be made up of a pattern of pixels contained within a square. The pixels include an encoding region that contains encoded data, along with a position finder pattern (such as the three squares disposed on three corners of the QR code) that allows an image capture device to assess the position and orientation of the barcode. To decode the QR code, the electronic device's barcode reading application captures a digital image of the QR code, detects the position finder pattern to determine a position and orientation of the barcode, and then analyzes the encoded data pattern to detect encoded data. The encoded data will include two functional elements: a public component directed to end users, and a private component directed to law enforcement. For example, in various embodiments the encoded information may include an end user landing page address and a law enforcement address or data element.

When an end user operates an end user electronic device 110 and decodes the barcode, the barcode scanning application will decode the symbology to identify a functional element, such as a URL structure. The application will then take an action corresponding to the public component of the functional element. For example, the application may cause the device to use a browser to send a request through a network 150 and retrieve a web page that is served by an end user server 170 to an end. This action is responsive to the public part of the decoded barcode and the private part of the barcode is ignored or hidden when serving the web page. This private, law enforcement part of the barcode has an encrypted or otherwise private form so that the decoding of the entire barcode still contains a sequence of numbers, characters, etc. that are encrypted using a strong encryption technique. For simplicity of explanation, the barcode symbology might encode a structure similar to <public header>/<private trailer> which is decoded as www.publicsite.org/<privatepackageinformation>. The end user server 170 retrieves and causes the publicly-accessible web page to display documents from an end user data store 172, which is a non-transitory storage medium containing document files that provide an end user with information about use and control of the regulated product. Such information may be provided by the government agency that regulates the controlled substance or other regulated product. For example, in the case of cigarettes, the end user server may retrieve and cause the web page to display or make available regulatory agency documents, such as documents relating to smoking cessation, documents relating to the reporting of underage smoking, general health information, counterfeit detection information, public service announcements and other information.

When a law enforcement official operates a law enforcement electronic device 120 and decodes the barcode, the barcode scanning application will detect the law enforcement component and take an action based on the law enforcement component. For example, the application may cause the device to use a browser to send a request through the network 150 to a secured web site and retrieve a web page that is served by an law enforcement server 160 using standard security and verification mechanisms, like login, like IP addresses, etc. This may include redirecting the web page address to an address that differs from the public address, e.g., from an address such as www.publicsite.org to an address such as www.securesite.gov. The law enforcement server 160 retrieves and causes the web page to display documents from a law enforcement data store 162, which is a non-transitory storage medium containing document files that are directed to provide the law enforcement official with information about the sale of the regulated product. This information based on the private portion of the barcode may verify or aid in verifying the authenticity of the scanned tax stamp, the correctness of the item with respect to the sales channel and location and other matters as stored in the law enforcement server.

The information that the law enforcement server 160 makes available may be provided by the government agency that regulates the controlled substance. For example, in the case of cigarettes, the law enforcement datastore 162 may contain a database that each individual unite of product (based on revenue stamp serial numbers) to the retailer that is selling the product unit, the law enforcement server may retrieve and cause the web page to display or make available an identification of the store that sold the product to which the revenue stamp is attached. The law enforcement server also may retrieve and display a web page containing data entry fields in which the law enforcement official can enter information, such as identifying information about the point of purchase; the name, address or other personally identifying information about the end user; or other data. This may help the agency track and receive reports of unauthorized use of the regulated product, such as underage smoking in the example of cigarettes. As an additional example, the law enforcement web page may include a data entry field in which the law enforcement official can enter a serial code from the revenue stamp, and the law enforcement server 160 may compare that serial code to valid codes in the data store 162 to determine whether the revenue stamp matches one of the valid codes and is therefore itself valid.

Figure 7:
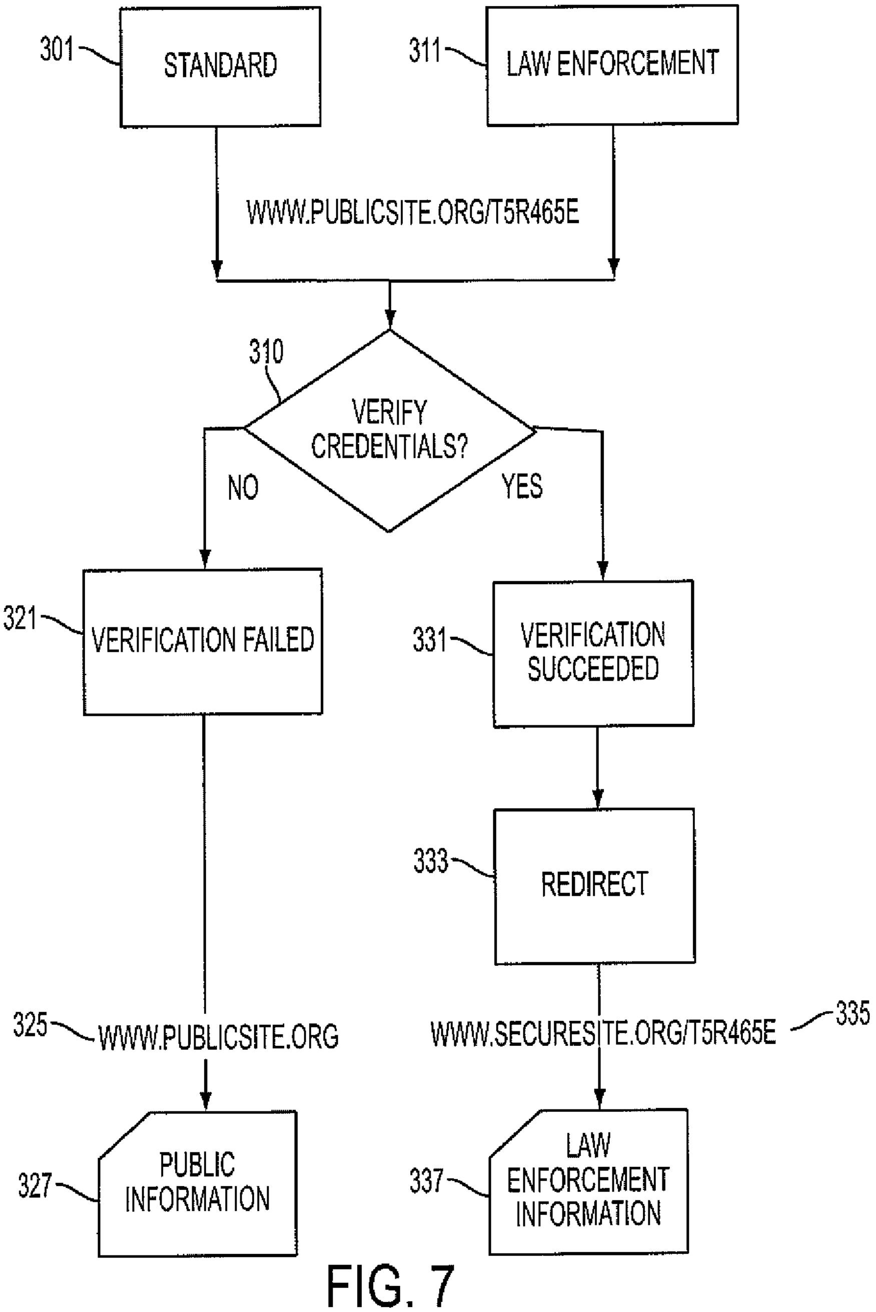
FIG. 7 is a block diagram showing a general flow of the use of barcode data in accordance with one embodiment.

In the embodiments described above, the decoded barcode data may have a public component, such as a commonly resolvable URL heading portion, combined with a commonly not resolvable tail component. An example is www.publicsite.org/T5R465E, as shown in FIG. 7. The end user landing page may be determined by the URL heading portion, and on the landing page the unresolved tail section will be ignored or hidden. The law enforcement implementation may either directly eliminate the header section and use the private tail component to inquire the database, or alternatively, it may redirect the request to the previous landing page while incorporating the law enforcement authorization making additional parts of the website accessible or redirecting the law enforcement to a secured location.

The example described above illustrates an end user electronic device that is operated by an end user and which contains programming instructions to recognize the end user functional element, along with a law enforcement electronic device that is operated by a law enforcement official and which contains programming instructions to recognize the law enforcement functional element. However, in some embodiments a single device can be operated by either an end user or a law enforcement official. If so, the barcode scanning application may include an authentication function in which the user enters an authentication element, such as a passcode, a biometric identifier, or another authentication element. The application will compare the received authentication element with one or more reference elements to determine whether the authentication element corresponds to an end user or to a law enforcement official. If the authentication element corresponds to that of an end user, the device will use the end user functional element to perform an end user function (such as connecting to the end user landing page). If the authentication element corresponds to that of a law enforcement official, the device will use the law enforcement functional element to perform a law enforcement function (such as connecting to the law enforcement landing page).

Similarly, the example described above illustrates a separate servers and datastores for end users and law enforcement officials. Optionally, a single server and/or a single data store may be used. In such situations the concept of an "end user server" and a "law enforcement server" may cover different functions served by a single server. Similarly, in such situations the concept of an "end user datastore" and a "law enforcement datastore" may cover different areas served by a single datastore. Thus, a single landing page may be provided, with the default being an end user landing page which has a user authentication field through which a law enforcement official may log in.

Figure 6:
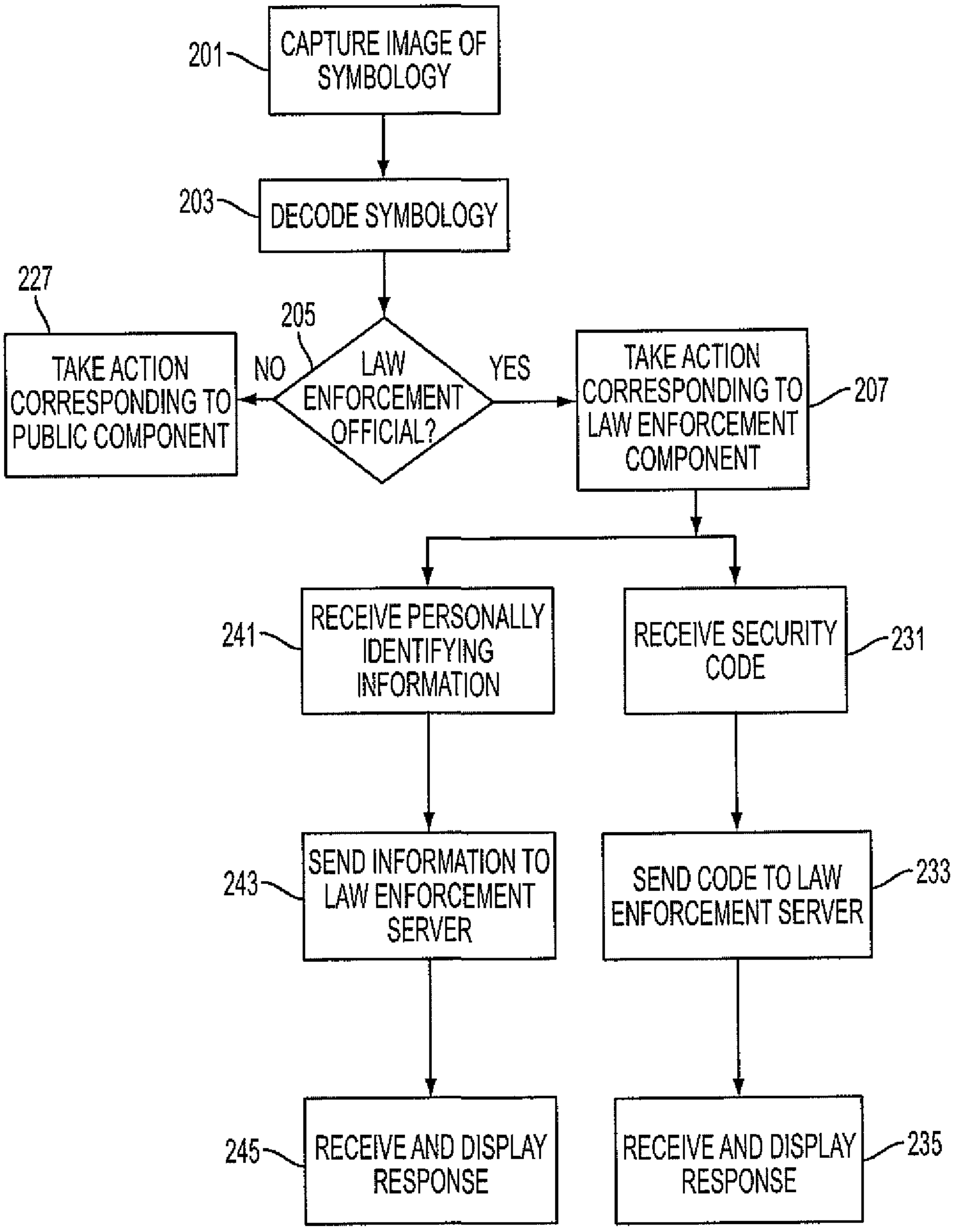
FIG. 6 is a flowchart illustrating actions that a system may implement in accordance with various embodiments.

FIG. 6 is a flowchart illustrating actions that a combined law enforcement and end user verification system for controlled substances may implement. In the system, a processor of a portable electronic device may execute a barcode scanning application that captures an image of a symbology, such as a 2D barcode (step 201). The application decodes the symbology (step 203) to identify an end user functional element and a law enforcement functional element. The application determines whether the device is operated by a law enforcement official or an end user (step 205). It may make this determination by any of several methods such as by requiring an operator of the device to enter an authentication code and determining whether the entered code corresponds to that of a law enforcement official. Alternatively, the device or the device's application may be specific for, or personally registered to, one or more law enforcement officials, and if so it may presume that any user who has achieved access to the device is a law enforcement official.

If the application determines that it is being operated by a law enforcement official, it may take an action to implement the law enforcement functional element (step 207). For example, the functional element may be an address of a law enforcement landing web page, and the device may open a browser and use the browser to display the landing page. This may require sending a request to an address of a law enforcement server via a communications network, receiving data corresponding to a law enforcement landing page, and displaying the law enforcement landing page on a display of the device.

In some embodiments, the law enforcement landing page may include a data entry field that allows the law enforcement official to enter a security code that is printed on the revenue stamp. The entry may occur manually, or it may occur manually by a text recognition application that receives the security code via an imaging device. When the device receives the security code (step 231), it may transmit the security code to the law enforcement server (step 233), which will compare the code to a list of known codes to determine whether the code is valid or invalid. The law enforcement server will then send the electronic device an indication of whether the code is valid or invalid, and the device may receive the indication and output the indication on its display (step 235). In some embodiments, the law enforcement server also may compare the code to a database that correlates security codes to points of purchase, and the law enforcement server may send the corresponding point of purchase information to the electronic device. The device may then receive the point of purchase information and output the point of purchase information on its display (also step 235).

In some embodiments, the law enforcement landing page may include a data entry field that allows the law enforcement official to enter a personally identifiable information relating to an end user of the regulate product. When the device receives such personally identifiable information (step 241), it may transmit the information to the law enforcement server (step 243). This may allow the law enforcement server to track illegal uses of regulated products, such as underage use of cigarettes. In some embodiments, the law enforcement server may compare this information to a database of authorized users and return the result to the electronic device for display to the law enforcement official (step 245). As an example, if the regulated product is a handgun, the law enforcement server may compare the personally identifiable information to that contained in a database of registered handgun owners to determine whether the end user is the owner of the handgun on which the symbology is affixed.

If the application does not determine that it is being operated by a law enforcement official, it may take an action to implement the end user functional element (step 227). For example, the functional element may be an address of an end user landing web page, and the device may open a browser and use the browser to display the end user landing page. This may require sending a request to an address of an end user server via a communications network, receiving data corresponding to an end user landing page, and displaying the end user landing page on a display of the device.

Thus, as shown in FIG. 7, a standard application 301 reading of the barcode may create an address string or URL in a browser that has a resolvable address, followed by an encrypted portion that is not resolved but does not create an error code. The application may attempt to verify user credentials 310 to determine whether or not the user is a law enforcement official. If a separate law enforcement application is used, this verification may have occurred when the law enforcement user initially launched the application. If the verification fails 321, i.e., if the application does verify that the user has presented the credentials of a law enforcement user, it will take an action corresponding to the public component of the functional element 325, such as by using a browser to open a publicly-available web page that enables the user to access public information 327. A law enforcement agent using a law enforcement specific application 311, or a law enforcement official who presents an appropriate credential, may initially be directed to the same public landing page as the public user, or to a different web page. Upon verification 331, be directed or redirected 333 to a secured web page 335 where the private component of the functional element information is used to address the appropriate information in the law enforcement or government web site 337. It is understood that this secured information might be obtained by alternate protocols or access than Hypertext Transfer Protocol or might even be available locally.

Figure 8:
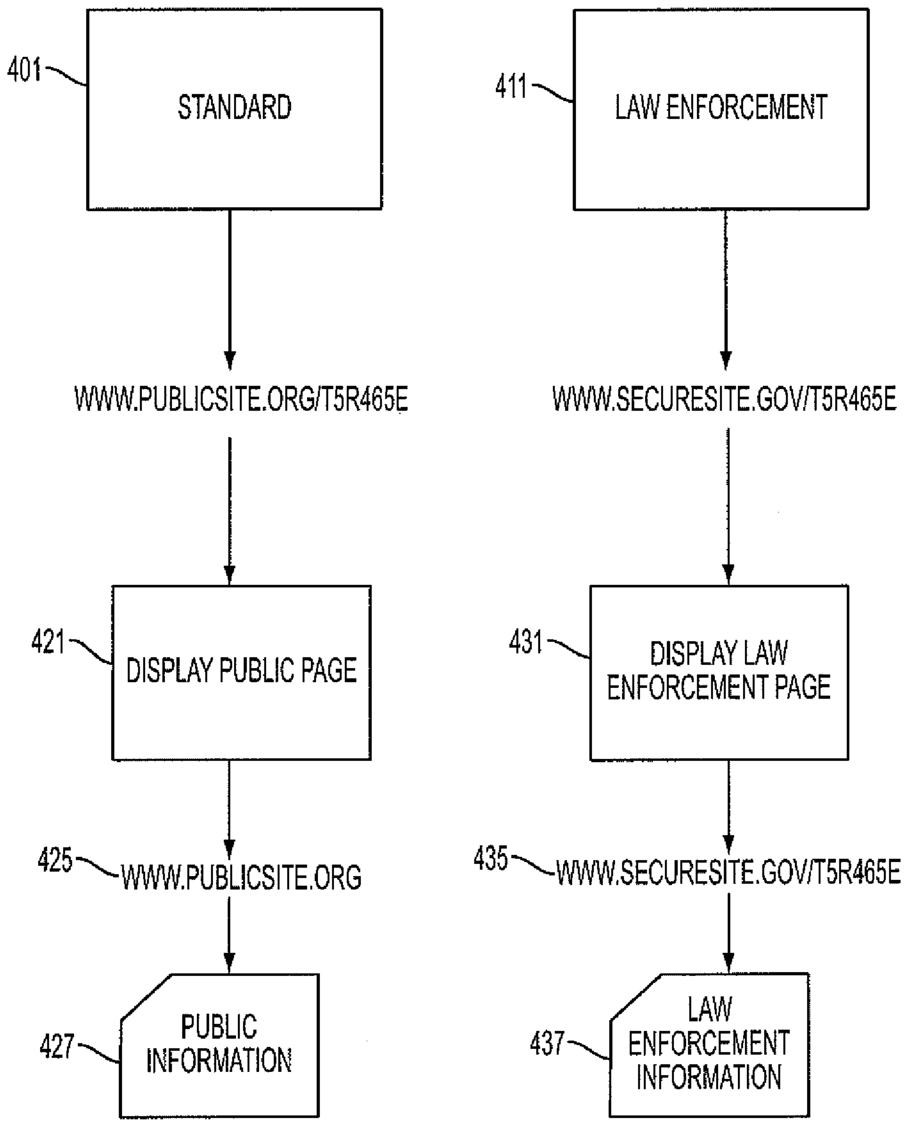
FIG. 8 is a block diagram showing a general flow of the use of barcode data in accordance with an alternate embodiment.

FIG. 8 shows an optional scenario where the standard application 401 and the law enforcement application 411 each may decode the barcode to yield a public component and a private component of a functional element. The standard application will take an action corresponding to the public component 425 such as displaying the public landing page 421. The user may use the landing page to obtain public information 427. If the law enforcement application decodes the barcode, it may change the public component to a known alternate law enforcement component, and it may then use the private component together with the alternate law enforcement component 435 to take a private action, such as directing the law enforcement user to a law enforcement landing page 431. The law enforcement landing page might allow a law enforcement officer to receive law-enforcement-specific information 437 and/or add credentials, like login or other information, to the web request and be led to a specific section that optionally will create an action responsive to the private part of the URL.

Figure 9:
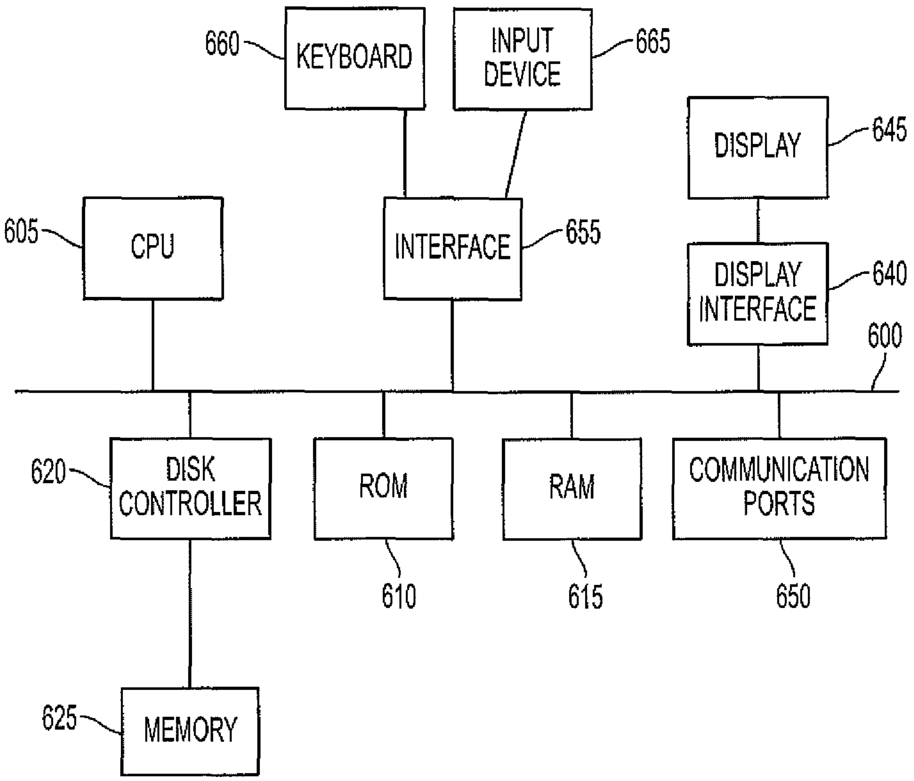
FIG. 9 is a block diagram showing elements of a computing device.

FIG. 9 depicts a block diagram of internal hardware that may be used to contain or implement program instructions, such as the portable electronic devices and servers described above. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 9 is a processing device, computing device or processor as such terms are used within this disclosure. Read only memory (ROM) 610 and random access memory (RAM) 615 constitute examples of memory devices or processor-readable storage media.

A controller 620 interfaces with one or more optional tangible, computer-readable memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-Ray™ disc; and/or other recording medium.

An optional display interface 640 may permit information from the bus 600 to be displayed on the display 645 in audio, visual, graphic or alphanumeric format. Communication with external devices, such as a printing device, may occur using various communication ports 650. A communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method comprising:

by an image capture module of a portable electronic device, capturing a digital image of a symbology that is affixed to a regulated product;

by a processor of the device, decoding the symbology to identify an end user functional element which has a public component and a law enforcement component;

by the processor, determining whether the device has received a law enforcement official verification;

if the device has received the law enforcement official verification, then, by the processor in response to decoding the symbology, using the law enforcement component of the functional element to take a first action, wherein the first action comprises:

sending, via a communications network, a request to an address of a law enforcement server, receiving, via the communications network from the law enforcement server, data corresponding to a law enforcement landing page, displaying, on a display of the electronic device, the law enforcement landing page, displaying a data entry field on the law enforcement landing page, receiving, via the data entry field, personally identifying information corresponding to a user of the regulated product, and sending the personally identifying information to the law enforcement server via the communication network; and if the device has not received the law enforcement official verification, then, by the processor in response to decoding the symbology, using the public component of the functional element to take a second action.

2. The method of claim 1, further comprising:

receiving a security code via the law enforcement landing page;

sending the security code to the law enforcement server via the communication network;

receiving, from the law enforcement server, an indication of whether the security code corresponds to a valid revenue stamp for the regulated product; and displaying, on the display, the indication.

3. The method of claim 2, further comprising:

by the law enforcement server based on the security code, determining a point of purchase for the regulated product;

receiving, by the portable electronic device from the law enforcement server, an identification of the point of purchase; and displaying the identification of the point of purchase on the display of the portable electronic device.

4. The method of claim 1, wherein determining whether the device has received a law enforcement official verification comprises:

receiving an authentication code; and determining whether the authentication code corresponds to a reference code of a law enforcement official.

5. The method of claim 1, wherein the second action comprises:

sending, via a communications network, a request to an address of an end user server;

receiving, via the communications network from the end user server, data corresponding to an end user landing page; and displaying, on a display of the portable electronic device, the end user landing page.

6. A method comprising:

by an image capture module of a portable electronic device, capturing a digital image of a symbology that is affixed to a regulated product;

by a processor of the device, decoding the symbology to identify an end user functional element which has a public component and a law enforcement component;

receiving an authentication code, and by the processor determining that the authentication code corresponds to a reference code of a law enforcement official; and by the processor in response to decoding the symbology, using the law enforcement component of the functional element to perform a sequence comprising:

sending, via a communications network, a request to an address of a law enforcement server, receiving, via the communications network from the law enforcement server, data corresponding to a law enforcement landing page, displaying, on a display of the electronic device, the law enforcement landing page, receiving a security code via the law enforcement landing page, sending the security code to the law enforcement server via the communication network, receiving, from the law enforcement server, an indication of whether the security code corresponds to a valid revenue stamp for the regulated product, displaying, on the display, the indication, displaying a data entry field on the law enforcement landing page, receiving, via the data entry field, personally identifying information corresponding to a user of the regulated product, and sending the personally identifying information to the law enforcement server via the communication network.

7. The method of claim 6, further comprising:

by the law enforcement server based on the security code, determining a point of purchase for the regulated product;

receiving, by the portable electronic device from the law enforcement server, an identification of the point of purchase; and displaying the identification of the point of purchase on the display of the portable electronic device.

8. A system, comprising:

an end user database containing data representative of instructional information relating to use of a regulated product by end users;

an end user server that is in communication with the end user database and a network;

a law enforcement database containing identifying seller data corresponding to sale of the regulated product;

a law enforcement server that is in communication with the end user database and a network; and a mobile electronic device application containing programming instructions that, when implemented, instruct the electronic device to:

capture a digital image of a symbology, decode the symbology to identify a functional element that includes a public component and a law enforcement component, determine whether a user of the electronic device is a law enforcement official, if the device determines that the user is a law enforcement official, implement an action corresponding to the law enforcement component, if the device does not determine that the user is a law enforcement official, implement an action corresponding to the public component, send, via a communications network, a request to an address of a law enforcement server;

receive, via the communications network from the law enforcement server, data corresponding to a law enforcement landing page; and display, on a display of the electronic device, the law enforcement landing page, display a data entry field on the law enforcement landing page, receive, via the data entry field, personally identifying information corresponding to a user of the regulated product, and send the personally identifying information to the law enforcement server via the communication network.

9. The system of claim 8, wherein the instructions, when implemented, also instruct the electronic device to:

receive a security code via the law enforcement landing page;

send the security code to the law enforcement server via the communication network;

receive, from the law enforcement server, an indication of whether the security code corresponds to a valid revenue stamp for the regulated product; and display, on the display, the indication.

10. The system of claim 9, wherein the instructions, when implemented, also instruct the electronic device to:

by the law enforcement server based on the security code, determine a point of purchase for the regulated product;

receive, by the electronic device from the law enforcement server, an identification of the point of purchase; and display the identification of the point of purchase on the display of the electronic device.

11. The system of claim 8, wherein the instructions that determine whether a user of the electronic device is a law enforcement official comprise instructions to:

receive an authentication code; and determine whether the authentication code corresponds to a reference code of a law enforcement official.

12. The system of claim 8, wherein the instructions, when implemented, also instruct the electronic device to:

send, via a communications network, a request to an address of an end user server;

receive, via the communications network from the end user server, data corresponding to an end user landing page; and display, on a display of the electronic device, the end user landing page.

* * * * *